(12) United States Patent
Pradines

(10) Patent No.: US 6,540,164 B1
(45) Date of Patent: Apr. 1, 2003

(54) APPARATUS FOR SPREADING GRANULAR MATERIAL, ESPECIALLY FOR THE TREATMENT OF ROADS

(76) Inventor: René Pradines, 9, rue du Commandant Raynal, F-78800 Houilles (FR)

(*) Notice: Subject to any disclaimer, the term of this patent is extended or adjusted under 35 U.S.C. 154(b) by 0 days.

(21) Appl. No.: 09/558,835

(22) Filed: Apr. 27, 2000

(30) Foreign Application Priority Data

Apr. 27, 1999 (FR) ............................................ 99 05312

(51) Int. Cl.⁷ .......................... A01C 19/00; E01C 19/20
(52) U.S. Cl. ...................................... 239/672; 239/671
(58) Field of Search ................................. 239/672, 671, 239/650, 661, 664, 668, 669, 675; 414/25, 509, 515, 518; 198/311, 728, 725, 716

(56) References Cited

U.S. PATENT DOCUMENTS 3,559,894 A * 2/1971 Murray et al. .............. 239/672
4,405,089 A    9/1983 Taylor
4,516,898 A *  5/1985 Cantenot ................... 414/309
4,600,097 A    7/1986 Temme et al.
5,165,766 A   11/1992 Thomas

FOREIGN PATENT DOCUMENTS

| FR | 2653456 | 4/1991 |
| FR | 2746118 | 9/1997 |
| GB |  773776 | 5/1957 |

* cited by examiner

Primary Examiner—Michael Mar
Assistant Examiner—Davis Hwu
(74) Attorney, Agent, or Firm—Dennison, Schultz & Dougherty

(57) ABSTRACT

Apparatus for spreading a granular material comprises a conveyor designed to move the material from a hopper to a distributor. The conveyor comprises two endless cables mounted in parallel and each passing around two end pulleys, parallel transverse bars each attached to the cables at regular intervals and designed to move the material on a transport surface, and a driving device designed to move the cables in synchronism. The granular materials may be for the winter treatment of roads.

8 Claims, 4 Drawing Sheets

APPARATUS FOR SPREADING GRANULAR MATERIAL, ESPECIALLY FOR THE TREATMENT OF ROADS

The invention relates to the spreading of granular materials, in particular sanding or salting materials for the winter treatment of roads, or materials for the construction or the repair of roads.

It relates in particular to apparatus for spreading a granular material of the type comprising a conveyor designed to feed the material from a hopper to a distributor.

Apparatus of this type is already known, designed either to be mounted on or to be towed by a truck or the like. The granular material, which is for example salt, sand, gravel, etc, and which is contained in the hopper, is fed by the conveyor to the distributor. The latter is generally in the form of a disk distributor placed at the rear end of the truck to spread the material on the road under treatment.

In the known apparatus of this type the conveyor normally takes the form of an endless flexible belt placed in a substantially horizontal position. This belt needs to be driven by powerful motors. Furthermore it has to be particularly strong in order to handle the significant loads to which it is subjected.

There is also known apparatus of this type in which the conveyor comprises an endless screw or the like having a substantially horizontal axis. Here again the apparatus requires powerful driving means in order to achieve the rotation of the endless screw.

In every case the conveyor has to be particularly strongly built in order to work in a particular environment.

The invention has in particular the aim of providing a solution to the above problems.

According to the invention, apparatus for spreading a granular material comprises at least one conveyor designed to move the material from a hopper to a distributor, the conveyor comprising two endless cables mounted in parallel and each passing around two end pulleys, transverse parallel bars each secured to the cables at regular intervals and designed to move the material along a transport surface, and driving means designed to move the cables in synchronism.

Thus the conveyor according to the invention comprises essentially parallel bars driven by endless cables and moving the material from the hopper to the distributor. It is thus the cables and the bars that handle the high mechanical forces of the conveyor. They can be made of a material having a high mechanical strength, for example stainless steel.

According to another feature of the invention the bars are fixed to the cables by attachment members designed to engage in recesses of appropriate shape provided on the periphery of at least one of the pulleys. Thus the pulleys act as toothed engaging means which ensure the driving of the cables by co-operation with the attachment members for the bars.

In one embodiment, each of the attachment members is a staple having two limbs joined together by a U-shaped hoop, while the above-mentioned recesses have a shape which is adapted to receive a respective hoop of an attachment member.

In another embodiment, each of the attachment members comprises a locking plate having a cylindrical pin, whilst the recesses have a shape adapted for receiving the respective pin of the attachment member.

The transport surface of the apparatus could be a substantially horizontal fixed surface above which the bars move. In this case these bars scrape along the transport surface in order to ensure the movement of the granular material.

This transport surface preferably constitutes the floor of the hopper and it extends as far as the distributor.

In another embodiment the bars and the cables are fixed to a continuous deformable conveyor belt which constitutes the transport surface. However, in this embodiment, the belt does not have to handle any forces since it is always the cables and the bars which provide the mechanical driving force.

In every case the hopper preferably has a wall provided with a calibrated opening past which the conveyor moves. The result is that it delivers a metered quantity of material depending on the cross-section of the calibrated opening and the linear speed of the conveyor.

The driving means preferably comprise at least one motor-driven spindle on which are secured two pulleys designed to drive the two cables in synchronism. Preferably each cable passes around a tension pulley.

In the description which follows and which is provided solely by way of example, reference is made to the accompanying drawings, in which.

Figure 1:
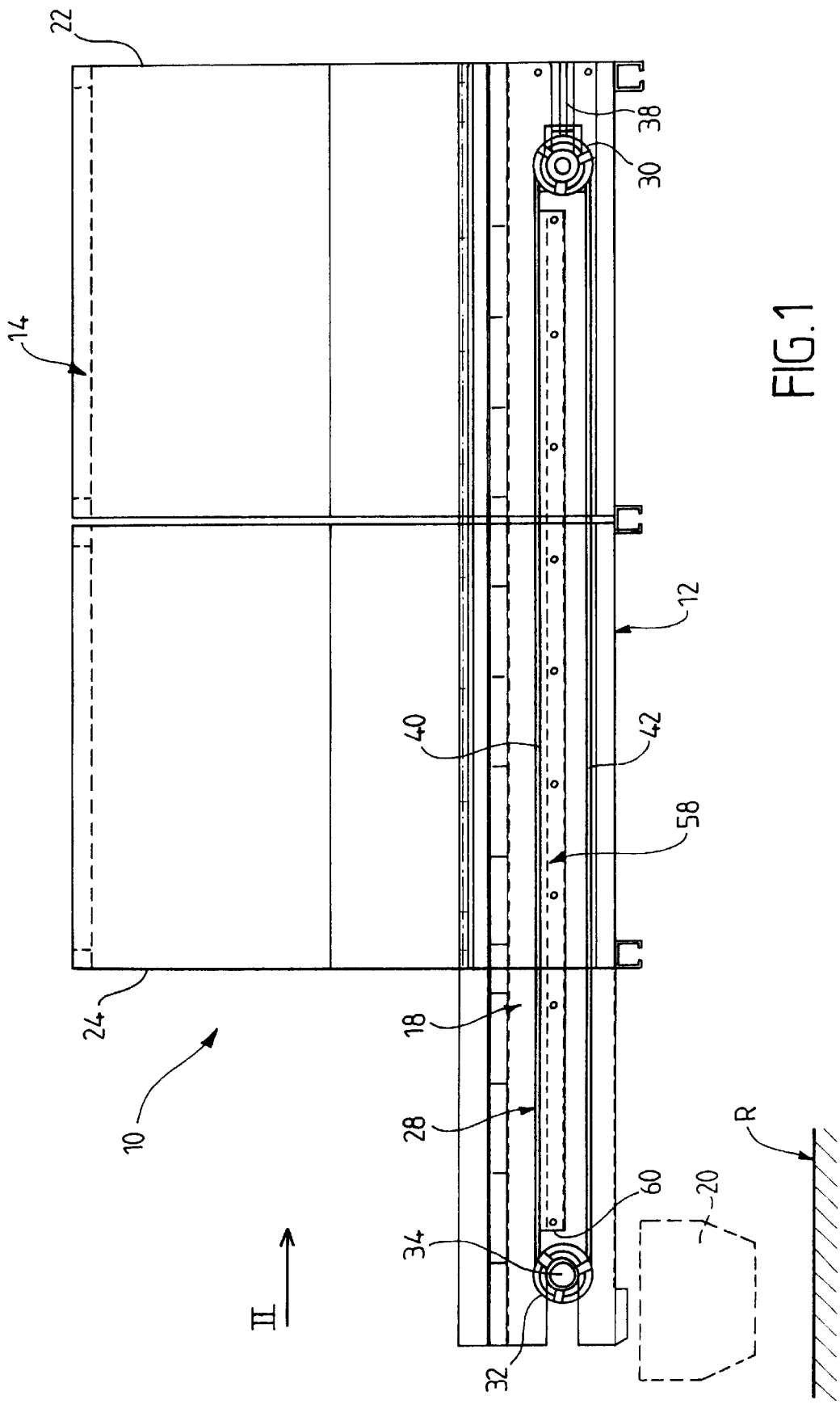
FIG. 1 is a side view of spreading apparatus according to the invention.
Figure 2:
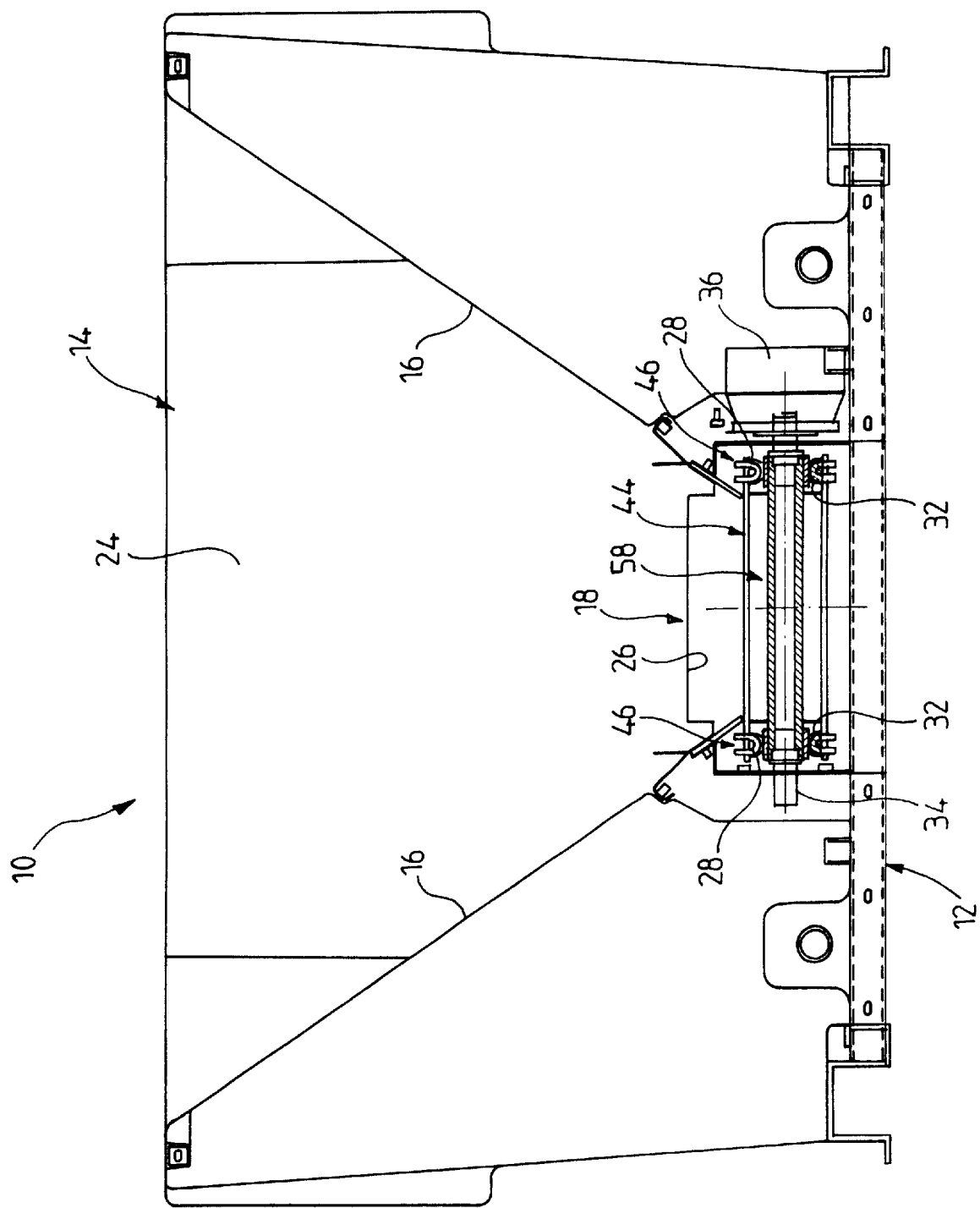
FIG. 2 is a rear view looking in the direction of the arrow II in FIG. 1.

FIGS. 1 and 2 show spreading apparatus 10 according to the invention designed to be mounted on a vehicle such as a truck or on a towed trailer. The apparatus 10 comprises a chassis 12 carrying a hopper 14 arranged towards the front of the said chassis. This hopper is designed to contain a granular material such as salting or sanding material (salt, sand, etc.) or a material intended for the maintenance or the repair of roads (gravel, etc.).

The hopper 14 has, in transverse section, a substantially trapezoidal shape (FIG. 2) bounded by two inclined walls 16 opening on to a conveyor 18 which at least partly forms the floor of the hopper 14. This conveyor 18 is designed to move the granular material from the hopper 14 to a distributor 20 at the rear end of the chassis and illustrated diagrammatically in FIG. 1. This distributor could for example take the form of a disk rotating about a vertical axis and fed from an endless screw or the like, to spread the material on a road R. The hopper 14 has a closed front wall 22 and an open back wall 24 provided with a calibrated opening 26 through which the conveyor 18 passes.

The conveyor 18 has two endless cables 28 mounted in parallel and each passing around two end pulleys: a front pulley 30 arranged towards the front of the hopper and a rear pulley 32 arranged near the distributor 20. The two rear pulleys 32 are secured on a motor-driven spindle 34 mounted horizontally and transversely with respect to the chassis 12. This driven spindle 34 is rotated by a motor 36 mounted on the chassis 12 (FIG. 2).

The pulleys 30 are tension pulleys and are each acted on by appropriate tension means 38. Thus each cable 28 comprises two principal segments which extend substantially horizontally: an upper run 40 and a lower run 42 (FIG. 1).

The cables 28 are made of steel, preferably of stainless steel, and are preferably of the multi-strand type to give them better flexibility. In a variant they could equally well be made of a synthetic material having mechanical properties comparable with those of steel.

Figure 3:
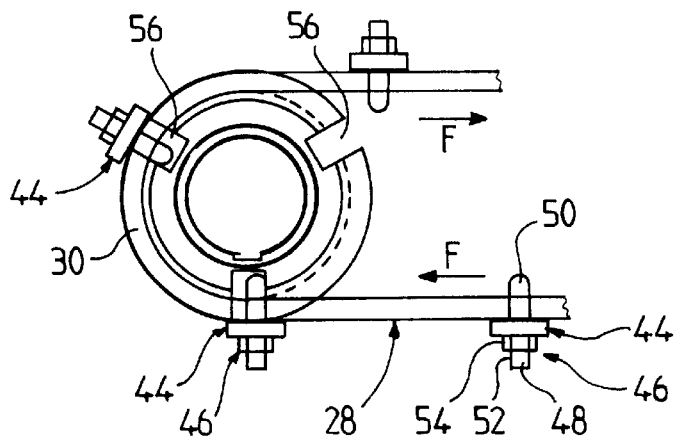
FIG. 3 is a partial side view of a conveyor according to a first embodiment of the invention.

The conveyor 18 furthermore includes a number of transverse bars 44 which extend parallel to one another and which are each fixed to the cables 28 at regular intervals (FIGS. 2 and 3). These bars are preferably made of stainless steel or again of a synthetic material having mechanical properties comparable with those of steel.

In the embodiment of FIGS. 1 to 3 each of the bars is fixed to each cable by an attachment member 46 made in the form of a staple. This staple has two limbs 48 joined together by a U-shaped hoop 50 and embraces the bar. Each of the limbs has a screw-threaded end 52 designed to receive a nut 54.

Thus the cable can be locked into the recess defined between the inside of the U-shaped hoop 50 and the end of the bar 44. The staples are orientated in such a way that the U-shaped hoop 50 points towards the inside and the bar is arranged on the outside of the cables (FIG. 3). At least one of the pulleys, for example the pulley 30 in FIG. 3, has recesses 56 formed in its periphery. In the example these recesses 56 are three in number and are arranged at angular spacings of 120°. They are each designed to receive the U-shaped hoop 50 of a staple 46 so as to constitute a kind of sprocket around which a respective cable 28 passes.

It will be appreciated that when the motor 36 is set in motion the two cables and the bars move in the direction indicated by the arrows F in FIG. 3.

In the embodiment of FIGS. 1 to 3, the hopper has in addition a transport surface 58 which is arranged at approximately the same level as, and between, the upper runs 40 of the two cables 28. The result is that the bars 46 scrape along this surface 58 to displace the granular material progressively from the hopper to the distributor 20. This transport surface 58 (FIG. 1) extends under the hopper 14 and as far as the distributor 20. The material is thus moved to the rear end 60 of the transport surface 58 and then falls under gravity to be taken up by the distributor 20.

We now refer FIGS. 4 to 7 to describe another embodiment of the invention which is similar to the one above except that each of the bars 44 is secured to the cables 28 by different attachment members.

Figure 4:
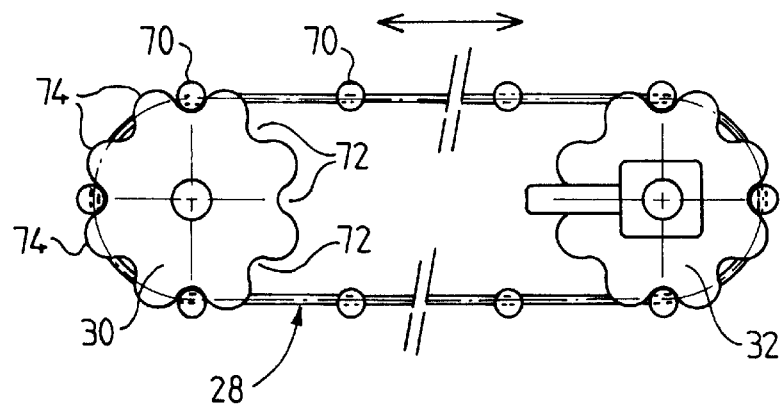
FIG. 4 is a side view of a conveyor according to a second embodiment of the invention.
Figure 5:
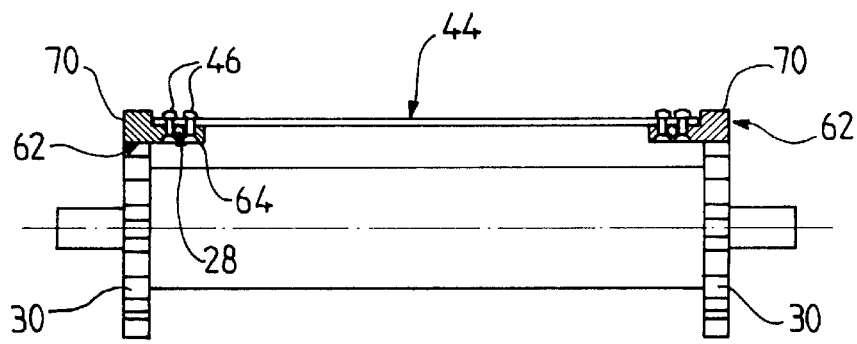
FIG. 5 is an end view, partially in section, of the conveyor of FIG. 4.
Figure 6:
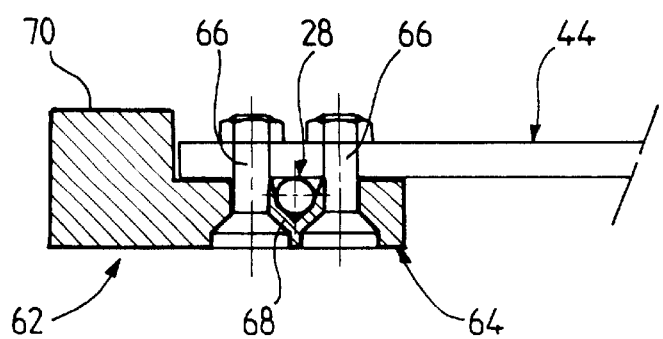
FIG. 6 shows a detail of FIG. 4 to a larger scale.
Figure 7:
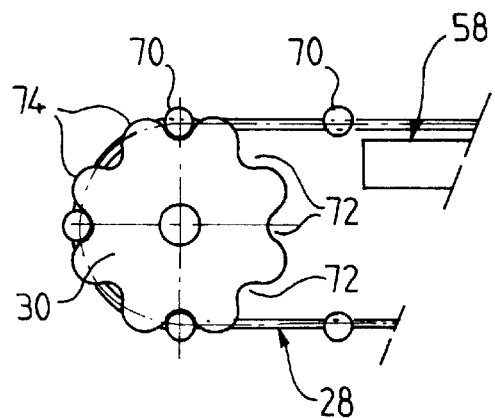
FIG. 7 is a partial view analogous to FIG. 6 and showing a variant.

In FIGS. 4 to 7 each attachment member 62 (FIGS. 5 and 6) comprises a locking plate 64 designed to be attached to one end of the bar 44 by a nut and bolt assembly 66, defining between them a recess 68 for the passage of the cable. Thus, when the two nut and bolt assemblies 66 are tightened, the cable is held trapped between the plate 64 and the end of the bar 44. The locking plate 64 is provided with a cylindrical pin 70 which extends as far as the end of the bar and which is designed to engage in recesses 72 of suitable shape, provided on each of the pulleys 30 and 32 (FIG. 4).

As shown, each of the pulleys has eight recesses 72 spaced at 45° from one another, adjacent recesses being separated by a tooth 74. Thus each of the pulleys 30 and 32 has the appearance of a sprocket wheel and is able to cooperate with the cylindrical pins 70. In a variant, only one of the pulleys, preferably the pulley 30 engaged by the tension means 38, is in the form of a sprocket whereas the other pulley 32 has a smooth surface.

In the embodiment of FIGS. 4 to 7 the bars scrape along a transport surface 58 in a manner analogous to that described above.

Reference will now be made to the embodiment of FIGS. 8 to 10 which is similar to that of FIGS. 4 to 7. This means that the bars are fixed to the cables by attachment members 62 analogous to those described above.

The principal difference lies in the fact that the transport surface in this case is constituted by a continuous deformable belt, made of rubber in this example. As can be seen in FIGS. 8 to 10, the belt is arranged inside the cables and is secured essentially to the bars by appropriate mechanical means.

The result is that the material is trapped in combination by the belt 76 and the bars 44. At the same time, as this belt is carried along by the bars and the cables it does not need to have a high degree of a mechanical strength like the belts of the prior art, which were subjected to all the mechanical stresses of conveying.

Figure 8:
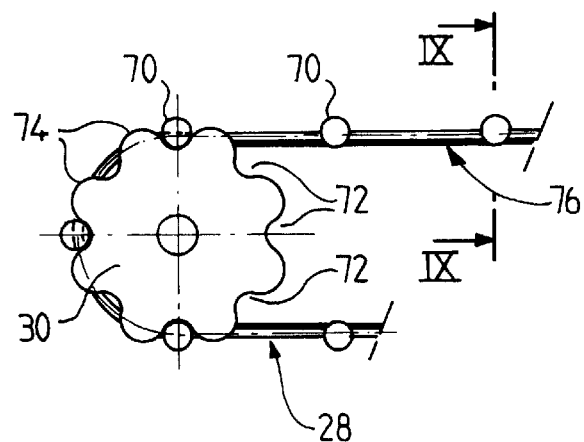
FIG. 8 is a view analogous to FIG. 7 showing another variant.
Figure 9:
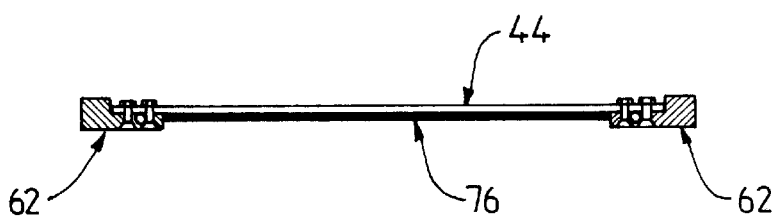
FIG. 9 is a section on the line IX—IX in FIG. 8.
Figure 10:
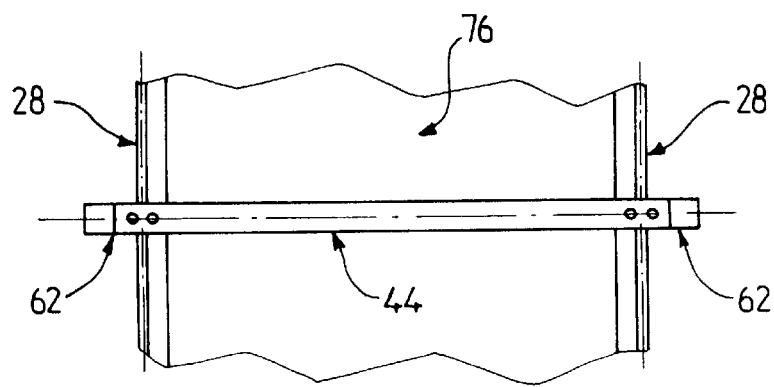
FIG. 10 is a view from above corresponding to FIG. 8.

It will be understood that it is also possible, in the embodiment of FIGS. 1 to 3, to replace the transport surface 58 by a flexible belt analogous to the flexible belt 76 of the embodiment of FIGS. 8 to 10.

In each case the material is dragged by the conveyor 18 and the quantity of material delivered can be adjusted by adjusting the linear speed of the conveyor and the cross-section of the calibrated opening 26 of the hopper.

It will be understood that the invention is not limited to the embodiments described above by way of example and it can extend to other variants. The essential point is that the equipment has dragging means formed by cables supporting transverse bars which serve to move the material, in combination with a transport surface.

It should be noted that in certain cases, in particular for machines of small dimensions, one could envisage using only a single cable supporting transverse bars mounted parallel to one another and at substantially regular spacings. This cable passes around end pulleys 30 and 32 so as to move the material along a transport surface.

The apparatus according to the invention finds one important application in the winter treatment of roads by salting or sanding. It can also be used to assist in the construction or maintenance of roads, for example by spreading gravel or similar material.

As well as spreading a granular material, it is clear that the invention is applicable also to the spreading of one or several granular materials accompanied, in appropriate cases, by a liquid phase, in particular to humidify the granular material or materials.

What is claimed is:

1. Apparatus for spreading a granular material, in particular for the treatment of roads, comprising at least one conveyor designed to move the material from a hopper to a distributor, said conveyor comprising two endless cables mounted in parallel and each passing over two end pulleys, with parallel transverse bars each fixed to said cables at regular intervals designed to move the material along a transport surface, and driving means designed to move said cables in synchronism, wherein said bars are attached to said cables by attachment members, and wherein said attachment members are engaged in corresponding recesses provided on the periphery of at least one of said pulleys.

2. Apparatus according to claim 1, wherein each of said attachment members is a staple having two limbs joined by a U-shaped hoop, and said recesses each have a shape matched to receive one of said U-shaped hoops of an attachment member.

3. Apparatus according to claim 1, wherein each of said attachment members comprises a locking plate provided with a cylindrical pin, and said recesses each have a shape adapted to receive said cylindrical pin of an attachment member.

4. Apparatus according to claim 1, wherein said transport surface is a substantially horizontal fixed surface above which said bars move.

5. Apparatus according to claim 4, wherein said transport surface constitutes the floor of said hopper and extends as far as said distributor.

6. Apparatus according to claim 1, wherein said hopper has a wall provided with a calibrated opening through which said conveyor passes.

7. Apparatus according to claim 1, wherein said driving means comprise at least one motor-driven spindle on which are secured two pulleys designed to move the two cables in synchronism.

8. Apparatus according to claim 1, wherein each said cable passes around a tension pulley.

* * * * *